(12) United States Patent
Cyrus et al.

(10) Patent No.: US 11,573,157 B2
(45) Date of Patent: *Feb. 7, 2023

(54) AIR SAMPLING ACTUATOR AND ASSOCIATED METHOD

(71) Applicant: Project Canary, PBC, Denver, CO (US)

(72) Inventors: Julian Cyrus, Littleton, CO (US); Luke Bowersox, Golden, CO (US); Colby Moxham, Golden, CO (US)

(73) Assignee: PROJECT CANARY, PBC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/495,516

(22) Filed: Oct. 6, 2021

(65) Prior Publication Data

US 2022/0034762 A1 Feb. 3, 2022

Related U.S. Application Data

(63) Continuation of application No. 17/217,979, filed on Mar. 30, 2021, now Pat. No. 11,150,167.

(Continued)

(51) Int. Cl.
  *G01N 1/22* (2006.01)
  *G01N 1/24* (2006.01)

(52) U.S. Cl.
  CPC ............ *G01N 1/2226* (2013.01); *G01N 1/24* (2013.01); *G01N 2001/2238* (2013.01)

(58) Field of Classification Search
  CPC .................. G01N 1/2226; G01N 1/24; G01N 2001/2238; G01N 1/2273; G01N 2001/248

(Continued)

(56) References Cited

U.S. PATENT DOCUMENTS

| 3,206,982 A | 9/1965 | Blondfield |
| 3,662,171 A | 5/1972 | Brengman et al. |

(Continued)

FOREIGN PATENT DOCUMENTS

| CH | 703014 A2 | 10/2011 |
| CN | 207351764 U * | 5/2018 |

(Continued)

OTHER PUBLICATIONS

U.S. Appl. No. 17/495,516, filed Oct. 6, 2021, Julian Cyrus.

(Continued)

*Primary Examiner* — Helen C Kwok
*Assistant Examiner* — Nashmiya S Fayyaz
(74) *Attorney, Agent, or Firm* — Stephen B. Katsaros; Patent Engineering, LLC

(57) ABSTRACT

An air sampling actuator and associated method are disclosed. The air sampling actuator may include a housing configured to mount on a canister, a motor configured to be accommodated in the housing, and an adaptor. The motor may generate a mechanical action, in response to a control signal received by the motor. The adaptor may be coupled to the motor, and configured to interface with a valve-controlling knob of the canister. In a first configuration of the air sampling actuator, the adaptor may be uncoupled from the valve-controlling knob of the canister, and the hook portion may be unengaged with the canister. In a second configuration of the air sampling actuator, the adaptor may be coupled with the valve-controlling knob of the canister, and the hook portion may be engaged with the canister.

15 Claims, 6 Drawing Sheets

Related U.S. Application Data

(60) Provisional application No. 63/005,057, filed on Apr. 3, 2020.

(58) Field of Classification Search
USPC .................................................. 73/864.63
See application file for complete search history.

(56) References Cited

U.S. PATENT DOCUMENTS

| | | | |
|---|---|---|---|
| 3,780,566 A | 12/1973 | Smith et al. | |
| 3,817,108 A * | 6/1974 | Principe | G01N 33/4972 |
| | | | 73/1.05 |
| 4,135,092 A | 1/1979 | Milly | |
| 4,551,719 A | 11/1985 | Carlin et al. | |
| 5,132,968 A | 7/1992 | Cephus | |
| 5,281,816 A | 1/1994 | Jacobson et al. | |
| 5,406,265 A | 4/1995 | Trozzo et al. | |
| 5,479,359 A | 12/1995 | Rogero et al. | |
| 5,568,121 A | 10/1996 | Lamensdorf | |
| 5,604,298 A | 2/1997 | Dosoretz et al. | |
| 6,061,141 A | 5/2000 | Goldenberg et al. | |
| 6,114,964 A | 9/2000 | Fasano | |
| 6,167,766 B1 | 1/2001 | Dunn et al. | |
| 6,169,488 B1 | 1/2001 | Ketler | |
| 6,252,510 B1 | 6/2001 | Dungan | |
| 6,259,956 B1 | 7/2001 | Myers et al. | |
| 6,317,029 B1 | 11/2001 | Fleeter | |
| 6,415,646 B1 | 7/2002 | Kessel et al. | |
| 6,490,530 B1 | 12/2002 | Wyatt | |
| 6,794,991 B2 | 9/2004 | Dungan | |
| 6,865,926 B2 | 3/2005 | O'Brien et al. | |
| 7,075,653 B1 | 7/2006 | Rutherford | |
| 7,080,544 B2 | 7/2006 | Stepanik et al. | |
| 8,485,019 B2 | 7/2013 | Groves | |
| 8,510,059 B2 | 8/2013 | Prince | |
| 8,712,335 B2 | 4/2014 | Mathur et al. | |
| 8,714,035 B2 | 5/2014 | Mihaylav et al. | |
| 8,949,037 B2 | 2/2015 | Prince et al. | |
| 9,018,963 B2 | 4/2015 | Sim et al. | |
| 9,075,016 B2 | 7/2015 | Groves | |
| 9,188,503 B2 | 11/2015 | Kloepper et al. | |
| 9,210,541 B2 | 12/2015 | Root et al. | |
| 9,754,472 B2 | 9/2017 | Johnson et al. | |
| 9,878,656 B2 | 1/2018 | Gergets et al. | |
| 9,978,251 B2 | 5/2018 | Gonia et al. | |
| 10,021,466 B2 | 7/2018 | Guglielmo et al. | |
| 10,031,040 B1 | 7/2018 | Smith et al. | |
| 10,089,849 B2 | 10/2018 | Liu et al. | |
| 10,119,890 B2 | 11/2018 | Massengale et al. | |
| 10,190,976 B2 | 1/2019 | Waxman et al. | |
| 10,210,738 B2 | 2/2019 | Johnson, Jr. et al. | |
| D842,134 S | 3/2019 | Doi et al. | |
| 10,371,682 B2 | 8/2019 | Berndt et al. | |
| 10,634,558 B1 | 4/2020 | Scott et al. | |
| 10,671,772 B2 | 6/2020 | Luquist et al. | |
| 10,697,947 B1 | 6/2020 | Armitage | |
| 10,814,028 B2 | 10/2020 | Becker et al. | |
| 10,876,890 B2 | 12/2020 | Scott et al. | |
| 11,193,822 B2 | 12/2021 | Scott | |
| 11,366,057 B2 | 6/2022 | Scott et al. | |
| 11,408,870 B2 | 8/2022 | Armitage | |
| 2001/0040509 A1 | 11/2001 | Dungan | |
| 2002/0070321 A1 | 6/2002 | Womack | |
| 2004/0056771 A1 | 3/2004 | Dungan | |
| 2006/0155486 A1 | 7/2006 | Walsh et al. | |
| 2008/0048853 A1 | 2/2008 | Leach et al. | |
| 2008/0231857 A1 | 9/2008 | Depeursinge et al. | |
| 2008/0281528 A1 | 11/2008 | Relle, Jr. | |
| 2009/0319058 A1 | 12/2009 | Rovaglio et al. | |
| 2010/0094565 A1 | 4/2010 | Prince et al. | |
| 2010/0268480 A1 | 10/2010 | Prince | |
| 2010/0295673 A1 | 11/2010 | Ahmad | |
| 2011/0219891 A1 | 9/2011 | Mihaylov et al. | |
| 2012/0012066 A1 | 1/2012 | Beery et al. | |
| 2012/0109583 A1 | 5/2012 | Bartlett et al. | |
| 2012/0212347 A1 | 8/2012 | Boone | |
| 2012/0227983 A1 | 9/2012 | Lymberopoulos et al. | |
| 2012/0270205 A1 | 10/2012 | Patel et al. | |
| 2014/0196788 A1* | 7/2014 | Taft | F17C 13/04 |
| | | | 137/1 |
| 2014/0368354 A1 | 12/2014 | Skourlis | |
| 2015/0048232 A1 | 2/2015 | Hallauer et al. | |
| 2015/0185194 A1 | 7/2015 | Prince et al. | |
| 2017/0130480 A1 | 5/2017 | Perkins | |
| 2017/0277829 A1 | 9/2017 | Weggler et al. | |
| 2017/0336281 A1 | 11/2017 | Waxman et al. | |
| 2018/0266933 A1 | 9/2018 | Tamraz et al. | |
| 2018/0284735 A1 | 10/2018 | Cella et al. | |
| 2019/0110444 A1 | 4/2019 | Boehm | |
| 2019/0166413 A1 | 5/2019 | Klinger et al. | |
| 2019/0206068 A1 | 7/2019 | Stark et al. | |
| 2019/0360311 A1 | 11/2019 | Cardenas et al. | |
| 2020/0333307 A1 | 10/2020 | Armitage | |
| 2020/0355580 A1* | 11/2020 | Asher | G01N 33/0004 |
| 2021/0072080 A1 | 3/2021 | Scott et al. | |
| 2022/0034762 A1 | 2/2022 | Cyrus et al. | |
| 2022/0091026 A1 | 3/2022 | Scott et al. | |

FOREIGN PATENT DOCUMENTS

| | | | |
|---|---|---|---|
| CN | 209979311 U | * | 1/2020 |
| CN | 212159251 U | * | 12/2020 |
| CN | 214667980 U | * | 11/2021 |
| CN | 214749208 U | * | 11/2021 |
| EP | 3001115 A2 | | 3/2016 |

OTHER PUBLICATIONS

F. I. Khan et al., "Safety weighted hazard index (swehi) a new, user-friendly tool for swift yet comprehensive hazard identification and safety evaluation in chemical process industries," 2001, Transactions of the Institution of Chemical Engineers, vol. 79 Part B, 16 pages (Year: 2001).

International Search Report and Written Opinion from the US International Search Authority for International Application No. PCT/US2020/012247 dated Mar. 10, 2020, 13 pages.

ISA/US, International Search Report and Written Opinion for PCT/S221/49702, 13 pages.

U.S. Appl. No. 63/233,694, Aug. 16, 2021, Anna Ailene Scott.

* cited by examiner

AIR SAMPLING ACTUATOR AND ASSOCIATED METHOD

CROSS REFERENCE TO RELATED APPLICATION

The present application is a continuation of U.S. Non-Provisional patent application Ser. No. 17/217,979 (also known as U.S. Pat. No. 11,150,167 which will issue on 19 October, 2021) entitled "AIR SAMPLING ACTUATOR AND ASSOCIATED METHOD", and filed 30 Mar. 2021 by Justin Cyrus, et al., which application claims priority to U.S. Provisional Patent Application No. 63/005,057 entitled "CANARY— AUTOMATIC CANISTER EQUIPMENT (ACE)", and filed Apr. 3, 2020 by Justin Cyrus, et al. The entirety of the aforementioned applications are incorporated herein by reference for all purposes.

TECHNICAL FIELD

This disclosure relates generally to sampling air, and particularly to an air sampling actuator deployable on a canister for sampling air, and a method of sampling air.

BACKGROUND

Monitoring and reducing air pollution is critical to our ecosystem. Historically, air monitoring has been performed using visual diagnostics or other human senses (e.g., hearing, smelling, etc.). The capturing and preservation of a sample of air from a location (e.g., an oil facility) is an important part of air sampling, for a variety of reasons, such as corporate sustainability commitments, quality of environment, regulatory requirements, etc. For example, an oil facility removing natural gas and/or oil from an underground reservoir utilizes equipment like pumpjacks, holding tanks, valves, pipes, etc. Occasionally, this equipment releases pollution into the atmosphere. This release into the atmosphere (air) is called 'fugitive gas emission' or generically 'pollution' that should be collected for measurement at a later time and/or at an offsite location.

In order to monitor the air, a sample of air is obtained in a canister which may be under vacuum. This process is generally performed manually, i.e., a user manually operates a valve of the canister to allow atmospheric air to be sucked inside the canister (due to the canister vacuum).

SUMMARY

An air sampling actuator deployable on a canister is disclosed, in accordance with an embodiment. In some embodiments, the air sampling actuator may include a housing configured to mount on the canister. The housing may include a hook portion configured to engage with the canister. The air sampling actuator may include a motor configured to be accommodated in the housing. The motor may be powered by an external electrical supply. Further, the motor may be configured to generate a mechanical action, in response to a control signal received by the motor. The air sampling actuator may further include an adaptor coupled to the motor. The adaptor may be configured to interface with a valve-controlling knob of the canister. In a first configuration of the air sampling actuator, the adaptor may be uncoupled from the valve-controlling knob of the canister, and the hook portion may be unengaged with the canister. In a second configuration of the air sampling actuator, the adaptor may be coupled with the valve-controlling knob of the canister, to transfer the mechanical action generated by the motor to the valve-controlling knob of the canister, to thereby reconfigure the valve-controlling knob of the canister. Further, in the second configuration of the air sampling actuator, the hook portion may be engaged with the canister.

A method of sampling air by an air sampling actuator is disclosed, in accordance with another embodiment. The method may include aligning and interfacing an adaptor of the air sampling actuator with a valve-controlling knob of a canister. The adaptor may be coupled to a motor. The motor may be configured to be accommodated in a housing of the air sampling actuator. The motor may be powered by an external electrical supply. Further, the motor may be configured to generate one or more mechanical actions, in response to a control signal received by the motor. Upon interfacing the adaptor with the valve-controlling knob of the canister, the method may further include engaging a hook portion of the housing with the canister. The method may further include triggering the motor to generate a first mechanical action, upon transmitting a first control signal to the motor, to perform sampling of air by the air sampling actuator.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, and together with the detailed description, explain the principles of the system. No attempt is made to show structural details in more detail than is necessary for a fundamental understanding of the system and various ways in which it is practiced. The following figures of the drawing include.

Figure 1:
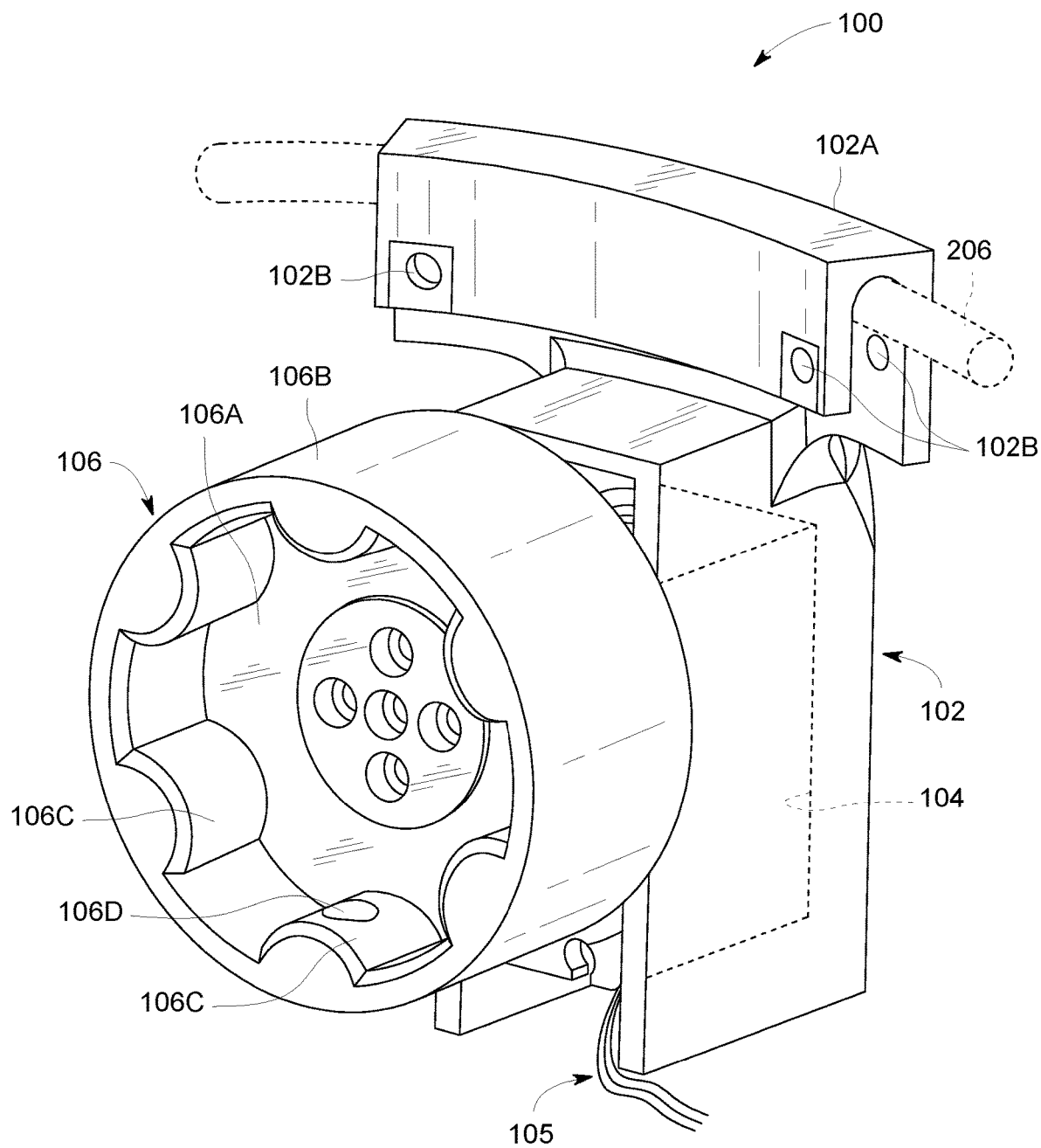
FIG. 1 illustrates a perspective view of an air sampling actuator, in accordance with an embodiment of the present disclosure.

In the appended figures, similar components and/or features may have the same numerical reference label. Further, various components of the same type may be distinguished by following the reference label with a letter. If only the first numerical reference label is used in the specification, the description is applicable to any one of the similar components and/or features having the same first numerical reference label irrespective of the suffix.

DETAILED DESCRIPTION

Illustrative embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

It should be noted that while the following description is configured for an oil and gas facility, other areas that may be configured with the present air sampling actuator (or simply, a device) deployable on a canister. For example, the disclosed device may be utilized at locations ranging from rural marshlands to urban industrial facilities. Other examples of monitored areas include, but are not limited to: beaches (for red-tide blooms), gas stations, painting facilities, parking lots, cattle feed lots, rendering facilities, propane refilling stations, truck servicing bays, etc. As used herein, the term 'monitored area' may mean any location where pollution presence (in or around) is monitored. The monitored site may be relatively large or, in one example configured as a wellsite, relatively small of about 0.2 to 2 acres. One application for the present pollution monitor is at/in/near 'oil facilities' such as: well sites, drilling rigs, service rigs, offshore platforms, refineries, petrochemical plants, gas plants, pipelines, tank farms, wellheads, pump jacks, etc.

In some application, one or more canisters may be deployed on a monitored site, and it may be desirable to obtain multiple samples at different times of day. Therefore, manually operating these numerous canisters repeatedly may be cumbersome, and involve excessive manual labor and labor cost. Moreover, manual operation may be prone to errors and it may not be possible to precisely control the amount of air sample to be received in the canister.

Some electrically controlled valves, for example, solenoid valves are known to be used on the canisters. However, these solenoid valves require the flow control to be modified for integration. Further, the solenoid valves require continuous human observation, and are prone to losing vacuum over time, especially in inclement weather. Moreover, the solenoid valves may introduce contaminants in the canisters. Some other existing solutions for automatically opening valves exist, that require integrating the valve with sensors. However, triggering a valve to open using these sensors (e.g. when a sensor reading exceeds a certain value) can be an arduous task.

Therefore, an adaptable device that can be installed on existing valves without requiring modification, is capable of accurately sampling air in an automated manner, and minimizes human intervention and errors resulting from the manual operation is desired.

FIG. 1 is a perspective view of an air sampling actuator 100 in accordance with one illustrative embodiment of the present disclosure. The air sampling actuator 100 may be configured to be deployed on a canister (not shown in FIG. 1).

Figure 2:
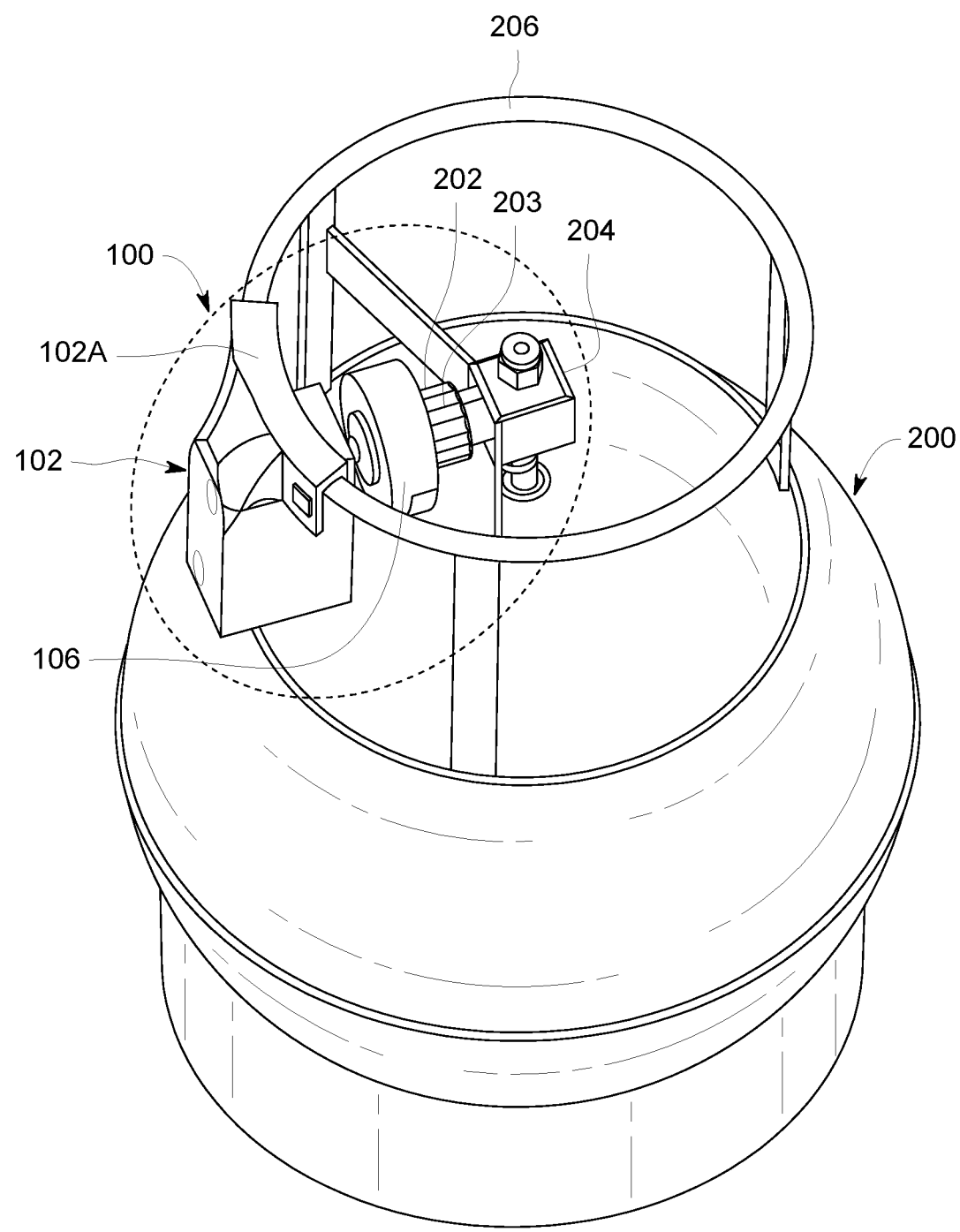
FIG. 2 illustrates a perspective view of an assembly of a canister and the air sampling actuator, in accordance with an embodiment of the present disclosure.

FIG. 2 illustrates an assembly of a canister 200 and the air sampling actuator 100 shown as deployed on the canister 200 in accordance with one illustrative embodiment of the present disclosure. The canister 200 may be used to obtain and store a sample of atmospheric air which is to be monitored. At initial deployment, the canister 200 may be under vacuum. The canister 200 may include a valve 204 which may be configured to maintain or release the vacuum inside the canister 200. For example, when the valve 204 is in closed position, the valve 204 may maintain the vacuum inside the canister 200. In other words, when the valve 204 is in closed position, the valve 204 may not allow atmospheric air to be inhaled (i.e. 'sucked') inside the canister 200 through the valve 204. However, when the valve 204 is in an open position, the valve 204 may allow the vacuum to be released, i.e., allow the atmospheric air to be sucked inside the canister 200 through the valve 204.

To operate the valve 204, i.e., reconfigure the valve 204 between the closed and the open position, the canister 200 may include a valve-controlling knob 202. This valve-controlling knob 202 may be used to operate the valve 204. For example, the valve-controlling knob 202 may be configured to be rotated in clockwise or anticlockwise direction to reconfigure the valve 204 between the closed and the open position. By configuring the valve 204 in the open position, a sample of atmospheric air may be sucked and collected inside the canister 200. This sample of air may later be monitored using an air monitoring system, for example, for determining the composition of the sampled air and therefore estimate the extent of polluting gases in the atmosphere of the monitored site.

With reference again to FIG. 1, the air sampling actuator 100 may include a housing 102 which may be configured to mount on the canister 200. The housing 102 may be made of any rigid material, including, but not limited to, a metal, an alloy, a plastic, etc. The housing 102 may include a hook portion 102A which may be configured to engage with the canister 200, as shown in FIG. 2. In particular, the hook portion 102A of the housing 102 may be configured to engage with a protective rim 206 of the canister 200. As it will be understood by those skilled in the art, the protective rim 206 may be provided on the canister 200 to protect the valve 204, the valve-controlling knob 202, and other accessories attached to the canister 200. By way of an example, as shown in the FIG. 2, the protective rim 206 may be circular shaped. In some embodiments, the shape of the hook portion 102A of the housing 102 may have a curvature matching with the circular shape of the protective rim 206 of the canister 200, to allow the hook portion 102A to engage with the protective rim 206 of the canister 200.

In order to reconfigure the valve-controlling knob 202 between the closed and the open position, the air sampling actuator 100 may further include a motor 104 (FIG. 1). The motor 104 may be configured to be accommodated in the housing 102. In some embodiments, the motor 104 may include a motor body which may be so shaped to allow the motor 104 to be accommodated in the housing 102 of the air sampling actuator 100.

In some embodiments, the motor 104 may be any kind of actuator working on mechanical or electro-mechanical principles used in machine automation. One such actuator may be a radio-control (RC) servo that converts rotational force of an electric rotary motor into rotary or linear movement to generate the requested movement. These electromechanical actuators provide high level of accuracy, have long lifecycle, and are low maintenance. Further, these electromechanical actuators are capable of developing high force, in the order of 100 kilonewtons (kN). For example, "Hiwonder LD-20MG" is one such servo. The motor 104 may be connected through a lead 105 (e.g. standard three-wire connection having two wires for a DC power supply and one wire for control carrying a pulse-width modulation PWM signal). This signal may be generated by simple electronics, or by microcontrollers.

One or more air sampling actuator(s) 100 along with canister(s) 200 may be provided in the monitored area to obtain samples of the atmospheric air. Each air sampling actuator 100 may be controlled by an individual or a common controller that may operate the air sampling actuator 100 to cause to collect samples of air. Further, these controller(s) may be handled manually at the time of sampling air, or may be programmed to automatically operate the air sampling actuator 100, at predetermined time slots, when air sampling is required to be performed. Further, in some embodiments, these controller(s) may operate the air sampling actuator 100 based on sensors inputs. The controller(s) may be coupled to one or more sensors installed in monitored area, that may provide data to the controller(s) based on which the controller(s) may cause the air sampling actuator 100 to perform sampling of air. For example, the sensors may include gas-leakage sensors, temperature sensors, pressure sensors, etc. that may provide indication of a gas accumulation, thereby triggering air monitoring and thus air sampling.

With continued reference to FIG. 1, the motor 104 may be configured to generate a mechanical action in response to a control signal received by the motor 104. This mechanical action may be transferred to the valve-controlling knob 202 to reconfigure the valve-controlling knob 202 (FIG. 2) between the closed and the open position. The motor 104 may receive the control signal via a control wire carrying pulse-width modulation (PWM) signals.

The motor 104 may include a feedback control that allows the motor to perform controlled opening and accurate closing position of the valve-controlling knob 202, and therefore of the valve 204. In some embodiments, the feedback control may be achieved using an optical encoder implemented along with the motor. As it will be appreciated by those skilled in the art, an optical encoder is an angular position sensor that may monitor parameters like speed and distance, to provide closed-loop feedback to the motor. Alternately, the motor 104 may be manually operated, such that the operator (a user) may control the motor to accurately to perform opening and closing of the valve-controlling knob 202 (without feedback).

To transfer the mechanical action generated by the motor 104 to the valve-controlling knob 202, the air sampling actuator 100 may include an adaptor 106. The adaptor 106 may be made of any rigid material, including, but not limited to, a metal, an alloy, a plastic, etc. The adaptor 106 may be coupled to the motor 104. As such, the mechanical action generated by the motor 104 may be transferred to the adaptor 106. For example, the motor 104 may cause the adaptor 106 to rotate in clockwise or anticlockwise direction, corresponding to the mechanical action generated by the motor 104. The adaptor 106 may be further configured to interface with the valve-controlling knob 202 of the canister 200. By way of interfacing with the valve-controlling knob 202, the adaptor 106 may transfer the mechanical action generated by the motor 104 to the valve-controlling knob 202 of the canister 200. Therefore, the adaptor 106 may cause the valve-controlling knob 202 to rotate in clockwise or anticlockwise direction, corresponding to the mechanical action generated by the motor 104.

In some embodiments, as shown in FIG. 1, the adaptor 106 may be cup-shaped and may include a web 106A and a flange 106B. For example, in some embodiments, as shown in FIG. 1, the web 106A may be a flat and circular part, and the flange 106B may be built along the circular periphery of the web 106A extending out from the web 106A, to form a cup shape. As such, the flange 106B may have an inner surface and an outer surface. In some embodiments, the inner surface of the flange 106B may include one or more detents 106C configured to engage with an outer surface 203 (FIG. 2) of the valve-controlling knob 202. The outer surface 203 of the valve-controlling knob 202 of the canister 200 may also include detents similar to the detents 106C, or any other profile which allows the detents 106C on the inner surface of the flange 106B to engage therewith. In general, the flange 106B of the adaptor 106 may include a profile with possible textured inner surface to create necessary friction force with or is able to snuggly fit on the valve-controlling knob 202, to transfer the mechanical to the valve-controlling knob 202.

Figure 8:
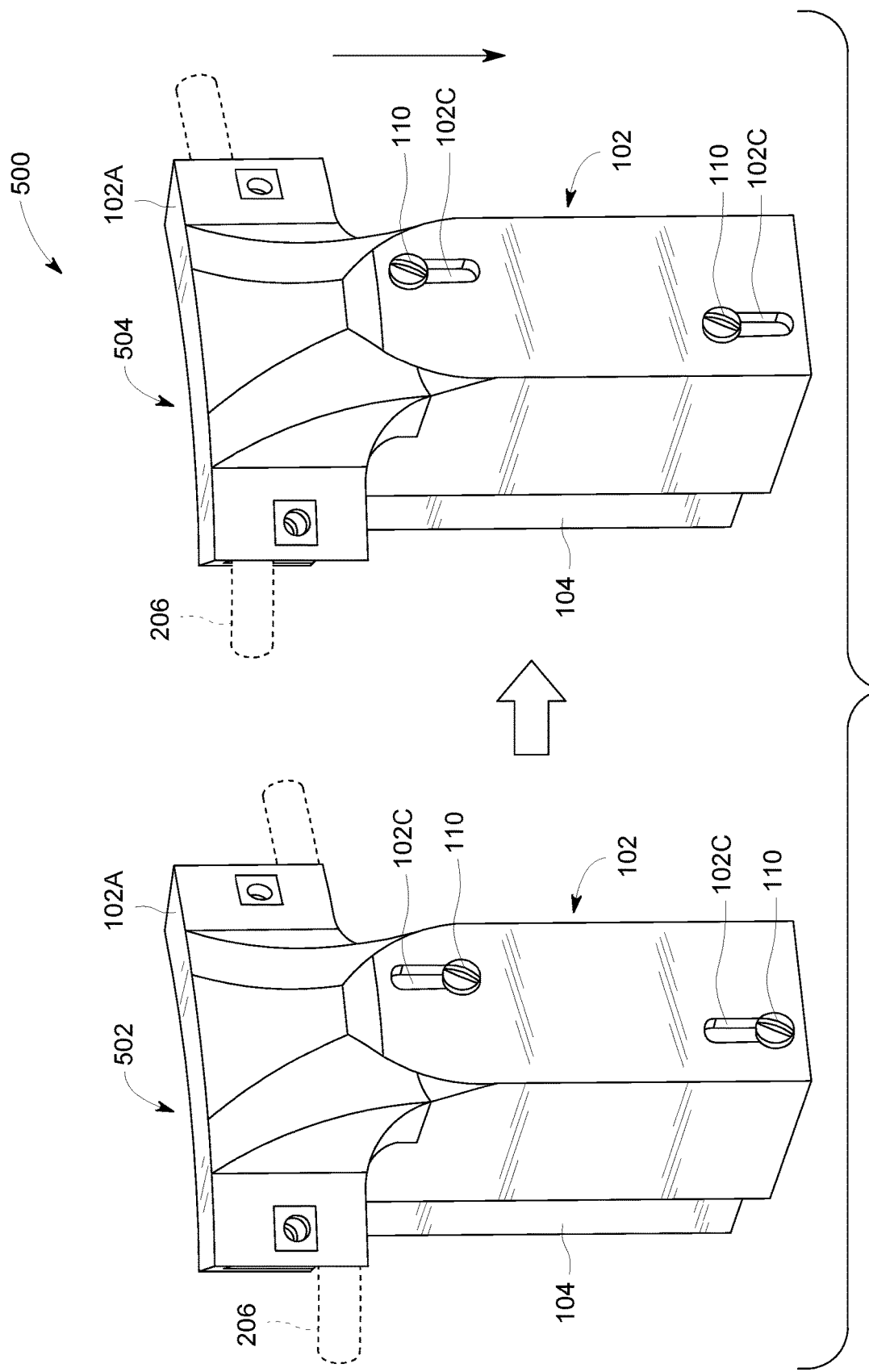
FIG. 8 illustrates a process of engaging a hook portion of the housing with the canister.

It may be noted that the air sampling actuator 100 may be configured to assume a first configuration or a second configuration (e.g. as shown in FIG. 8). The air sampling actuator 100 may be in the first configuration, when the air sampling actuator 100 is not deployed on the canister 200. However, when deployed on the canister 200, the air sampling actuator 100 may be reconfigured into the second configuration. As such, in the first configuration of the air sampling actuator 100, the adaptor 106 may be uncoupled from the valve-controlling knob 202 of the canister 200. Further, in the first configuration of the air sampling actuator 100, the hook portion 102A may be unengaged from the canister 200.

In the second configuration of the air sampling actuator 100, the adaptor 106 may be coupled with the valve-controlling knob 202 of the canister 200. As a result of this coupling, the adaptor 106 is able to transfer the mechanical action generated by the motor 104 to the valve-controlling knob 202 of the canister 200, to thereby reconfigure the valve-controlling knob 202 of the canister 200 between open and closed position. Further, in the second configuration of the air sampling actuator 100, the hook portion 102A may be engaged with the canister 200.

During operation, in order to deploy the air sampling actuator 100 (in its first configuration) on the canister 200, the adaptor 106 may have to be aligned and interfaced with the valve-controlling knob 202 of a canister 200. The adaptor 106 may be first aligned with the valve-controlling knob 202 and then pushed on to the valve-controlling knob 202 to thereby interface the adaptor 106 with the valve-controlling knob 202. In particular, the one or more detents 106C on the inner surface of a flange 106B of the adaptor 106 may be aligned with the outer surface of the valve-controlling knob 202. Then, the adaptor 106 may be pushed on to the valve-controlling knob 202 to interface the adaptor 106 with the valve-controlling knob 202.

In some embodiments, the air sampling actuator 100 may further include an integration mount. The integration mount may bring the motor 104 and the adaptor 106 in alignment for proper transfer of motion (torque) from the motor 104 to the valve 204. The integration mount may therefore mount on both the motor 104 and the canister 200. Further, the integration mount may provide weather protection, especially when the air sampling actuator 100 is installed in the outside environment.

Once the adaptor 106 is interfaced with the valve-controlling knob 202, in order to deploy the air sampling actuator 100 on the canister, the adaptor 106 may have to be locked with the valve-controlling knob 202. To this end, in some embodiments, the adaptor 106 may include an anchor hole 106D on the flange 106B of the adaptor 106. Correspondingly, the valve-controlling knob 202 may also have a hole to match with anchor hole 106D. The adaptor 106 may be configured to be locked with the valve-controlling knob 202, by fitting an anchoring fastener (not shown in FIGS. 1-2) through the anchor hole 106D and the hole of the valve-controlling knob 202. By way of an example, the anchoring fastener may be a bolt, a screw, a pin, a cotter, or the like.

Further, once the adaptor 106 is interfaced with the valve-controlling knob 202, the hook portion 102A of the housing 102 may be engaged with the protective rim 206 of the canister 200, to thereby mount the housing 102 on the canister 200. To this end, as mentioned earlier, the shape of the hook portion 102A may have a curvature matching with the circular shape of the protective rim 206 of the canister 200, to allow the hook portion 102A to engage with the protective rim 206 of the canister 200.

In some embodiments, the housing 102 may be configured to slide relative to the motor 104. In some embodiments, in the first configuration of the air sampling actuator 100, the housing 102 may be positioned vertically upwards relative to the motor 104. Once the adaptor 106 is interfaced with the valve-controlling knob 202, in order to engage the hook portion 102A with the protective rim 206, the housing 102 may have to be moved vertically downwards relative to the motor 104. This may be done by sliding the housing 102 downwards, so as to reposition the housing 102 relative to the motor 104. By way of sliding and repositioning the housing 102, the hook portion 102A of the housing may be caused to engage with the protective rim 206 of the canister 200, to thereby engage the housing 102 with the canister 200.

Additionally, in some embodiments, in order to deploy the air sampling actuator 100 on the canister 200, the housing 102 may be locked with the canister 200 using one or more locking fasteners. To this end, the housing 102 may include one or more locking holes 102B on the hook portion 102A of the housing 102. The housing 102 may be locked with the canister 200, by using one or more locking fasteners (not shown in FIGS. 1-2) through the one or more locking holes 102B on the hook portion 102A of the housing 102. By way of an example, the one or more locking fasteners may include bolts, or nut-bolt assembles, or screws, etc. As shown in FIG. 1, the one or more locking holes 102B may allow the one or more locking fasteners to pass across the hook portion 102A of the housing 102 to thereby fasten the housing 102 with the protective rim 206 of the canister 200.

Further, additionally, in some embodiments, in order to deploy the air sampling actuator 100 on the canister 200, the housing 102 may be fastened with the motor 104 using one or more securing fasteners. To this end, the housing 102 may include one or more slots (not shown in FIGS. 1-2), to secure the housing 102 with the canister 200. The housing 102 may be fastened with the canister 200, by using one or more securing fasteners (not shown in FIGS. 1-2) passing through the one or more slots. This is explained in detail in conjunction with FIG. 8.

Figure 3:
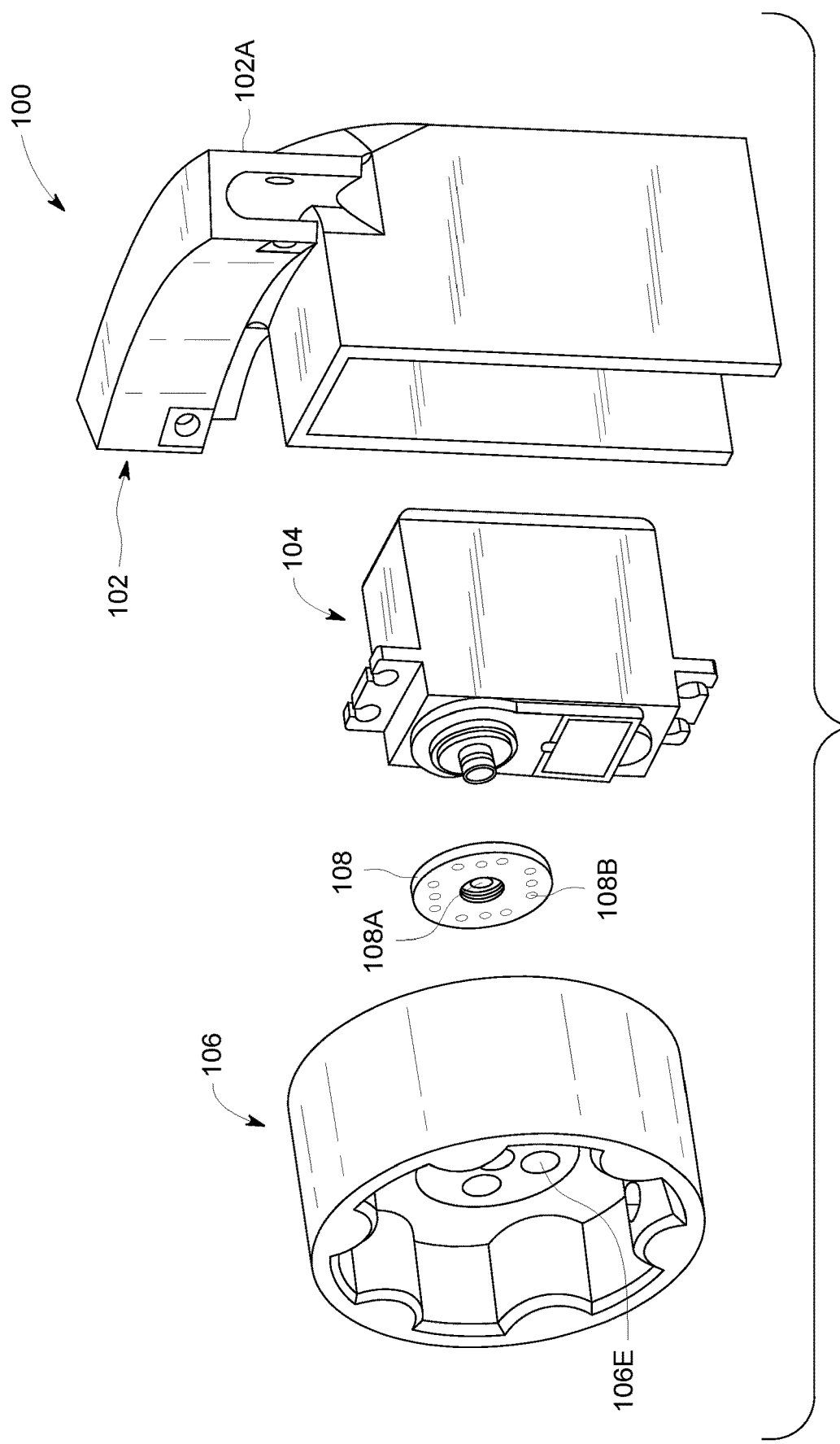
FIG. 3 illustrates a perspective view of an unassembled air sampling actuator, in accordance with an embodiment of the present disclosure.

Referring now to FIG. 3, a perspective view of an unassembled air sampling actuator 100 is illustrated, in accordance with an embodiment. The sampling valve actuator device 100 may include the housing 102, the motor 104, and the adaptor 106. The motor 104 may be configured to be accommodated in the housing 102. Further, the adaptor 106 may be coupled to the motor 104.

In some embodiments, as shown in FIG. 3, the adaptor 106 may be coupled to the motor 104 via a bracket 108. For example, an output shaft of the motor 104 may include one or more splines. Further, a central region of the bracket 108 may include a center hole 108A with one or more indentations to fit on the output shaft with the one or more splines. The adaptor 106 may be configured to be fitted to the bracket 108. To this end, the bracket 108 may include one or more periphery holes 108B. Correspondingly, the adaptor may include one or more fitting holes 106E. The adaptor 106 may, therefore, be fitted to the bracket 108 via the one or more periphery holes 108B and the one or more fitting holes 106E, using one or more fastening members. These fastening members may include bolts, screws, pins, etc.

Figure 4:
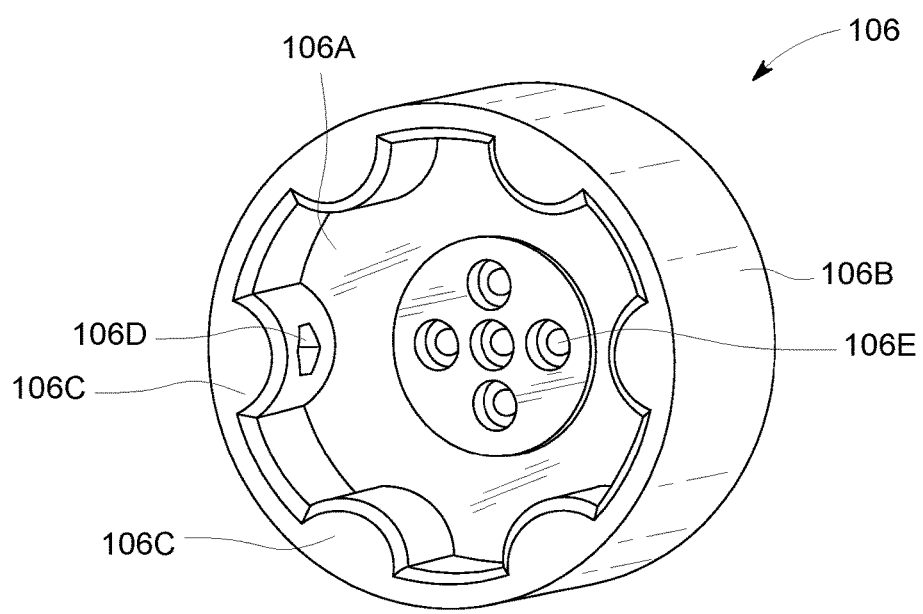
FIG. 4 illustrates a perspective view of an adaptor of the air sampling actuator, in accordance with an embodiment of the present disclosure.

FIG. 4 illustrates a magnified perspective view of the adaptor 106, in accordance with an embodiment of the present disclosure. As mentioned before, the adaptor 106 may be cup-shaped having the web 106A and the flange 106B. Further, the inner surface of the flange 106B may include one or more detents 106C configured to engage with an outer surface 203 of the valve-controlling knob 202. Furthermore, the adaptor 106 may include the anchor hole 106D on the flange 106B. The anchor hole 106D may allow the adaptor 106 to be locked with the valve-controlling knob 202 of the canister 200, by fastening an anchoring fastener (not shown in FIG. 4) through the anchor hole 106D. As mentioned above, the adaptor 106 may further include one or more fitting holes 106E to allow the adaptor 106 to be fitted to the bracket 108.

Figures 5, 6:
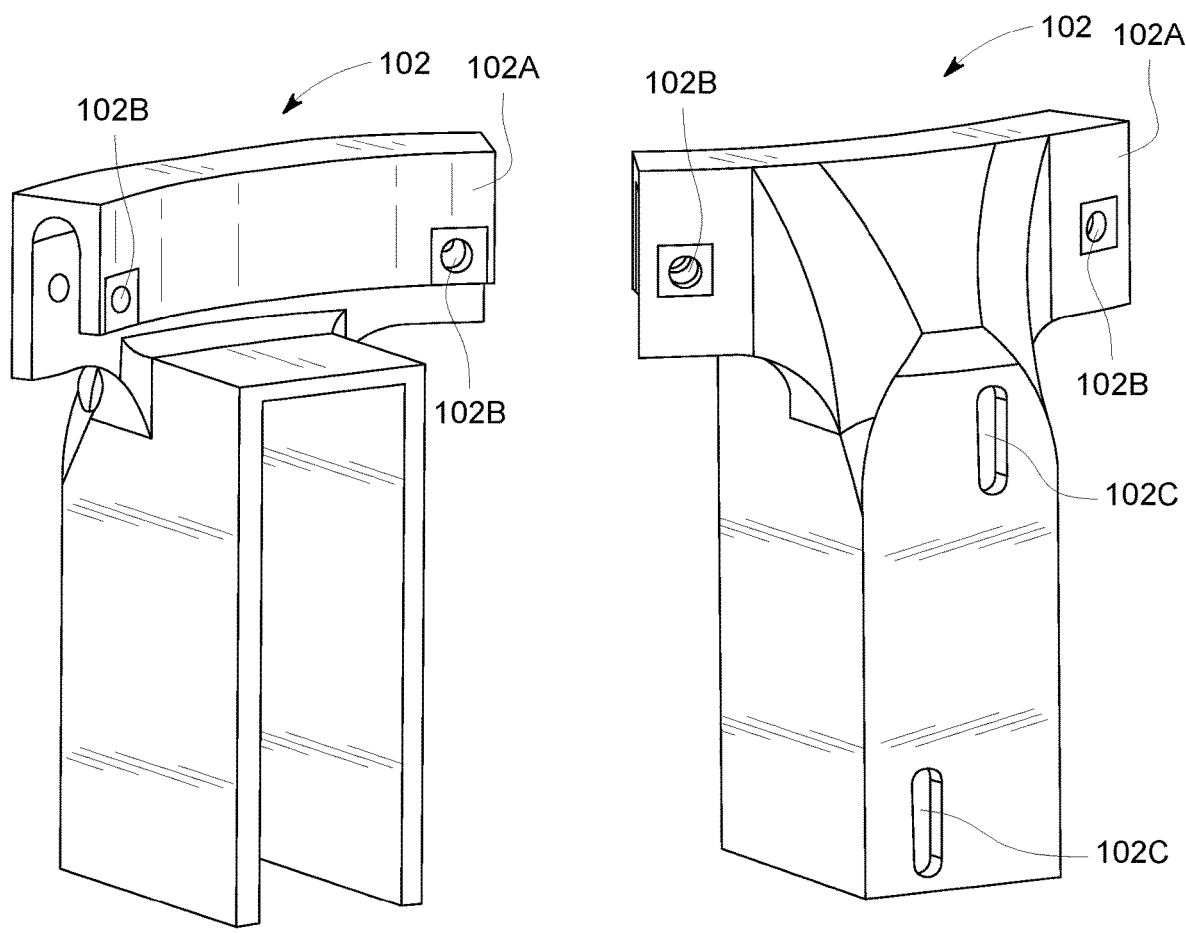
FIG. 5 illustrates a front perspective view of a housing of the air sampling actuator, in accordance with an embodiment of the present disclosure.
FIG. 6 illustrates a back perspective view of the housing of FIG. 8.

FIGS. 5-6 illustrate a front perspective view and a rear perspective view, respectively, of the housing 102, in accordance with an embodiment of the present disclosure. As shown in FIGS. 5-6, the housing 102 may include the hook portion 102A. Further, the housing 102 may include one or more locking holes 102B on the hook portion 102A. The housing 102 may be locked with the canister 200, by using one or more locking fasteners (not shown in FIGS. 5-6) through the one or more locking holes 102B.

Figure 7:
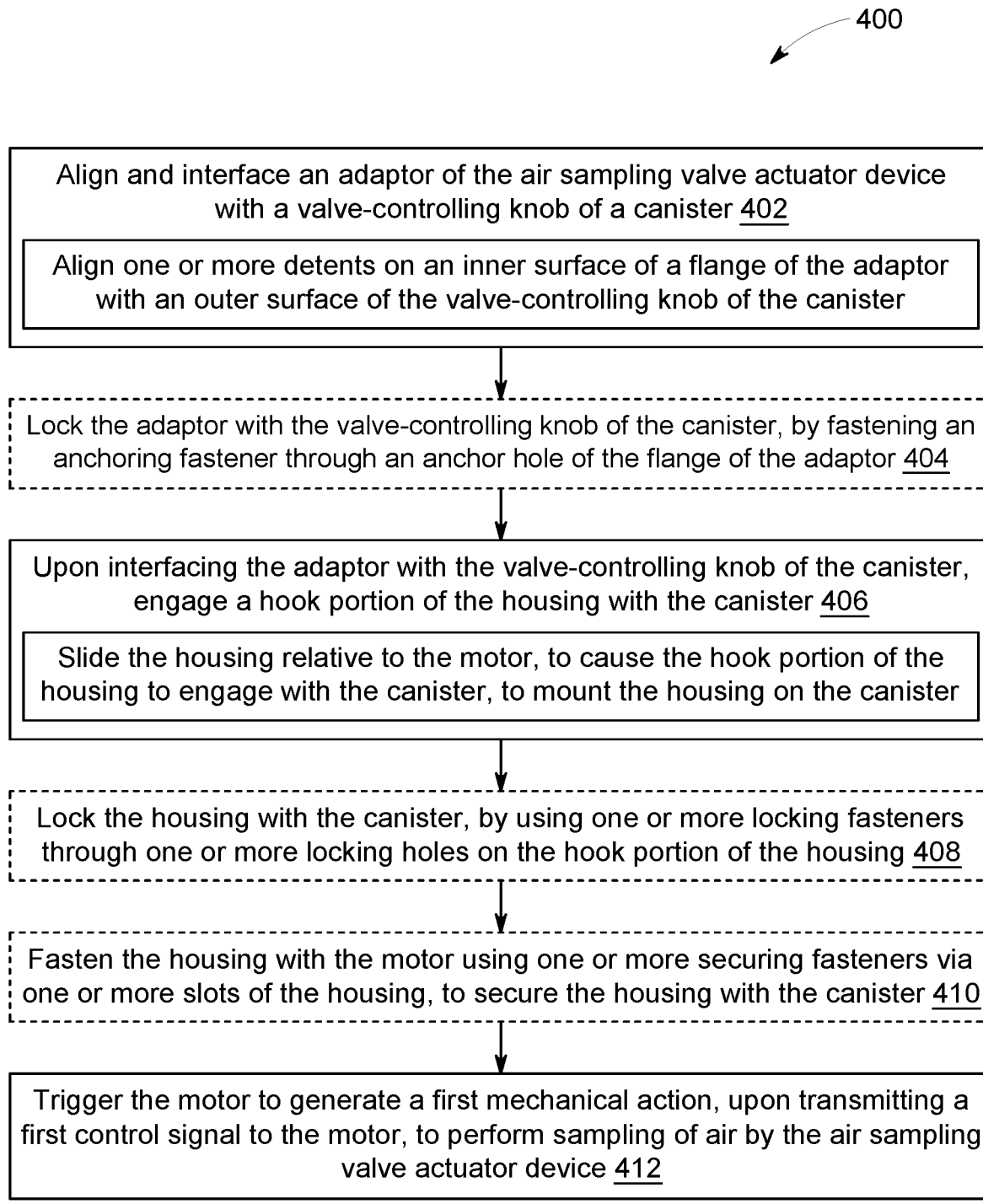
FIG. 7 is a flowchart of a method of sampling air by the air sampling actuator, in accordance with an embodiment of the present disclosure.

Referring now to FIG. 7, a flowchart of a method 400 of sampling air by the air sampling actuator 100 is disclosed, in accordance with an embodiment of the present disclosure. The method 400 may be performed by the air sampling actuator 100 deployed on the canister 200. As mentioned earlier, the canister 200 may be may be under vacuum and capable of receiving and storing atmospheric air. Further, the canister 200 may include the valve 204 configured to maintain or release the vacuum inside the canister 200. The valve 204 may be operated by the valve-controlling knob 202.

At step 402, the adaptor 106 of the air sampling actuator 100 may be aligned and interfaced with the valve-controlling knob 202 of the canister 200. As explained in conjunction with FIGS. 1-3, the adaptor 106 may be coupled to the motor 104 of the air sampling actuator 100. The motor 104 may be configured to be accommodated in the housing 102 of the air sampling actuator 100. Further, the motor 104 may be powered by an external electrical supply. Furthermore, the motor 104 may be configured to generate one or more mechanical actions, in response to a control signal received by the motor 104.

In some embodiments, in order to align the adaptor 106 with the valve-controlling knob 202, the one or more detents 106C on the inner surface of a flange 106B of the adaptor 106 may be aligned with the outer surface 203 of the valve-controlling knob 202. Once the one or more detents 106C are aligned with the outer surface 203 of the valve-controlling knob 202, the adaptor 106 may be pushed on to the valve-controlling knob 202 to interface the adaptor 106 with the valve-controlling knob 202. It should be noted that the valve-controlling knob 202 may be positioned in a preferred angular position, at the time of interfacing the adaptor 106 with the valve-controlling knob 202. For example, the valve-controlling knob 202 may be fully closed (i.e. angular position of the valve-controlling knob 202 corresponding to the valve-controlling knob 202 being fully closed), when interfacing (i.e. fitting) the adaptor 106 with the valve-controlling knob 202.

Additionally, in some embodiments, at step 404, the air adaptor 106 may be locked with the valve-controlling knob 202 of the canister 200, by fastening the anchoring fastener through the anchor hole 106D of the flange 106B of the adaptor 106. By way of an example, the anchoring fastener may be a bolt, a screw, a pin, a cotter, or the like.

At step 406, upon interfacing the adaptor 106 with the valve-controlling knob 202, the hook portion 102A of the housing 102 may be engaged with the canister 200. In other words, the hook portion 102A of the housing 102 may be engaged with the protective rim 206 of the canister 200, to thereby mount the housing 102 on the canister 200. The shape of the hook portion 102A may have a curvature matching with the circular shape of the protective rim 206 of the canister 200, to allow the hook portion 102A to engage with the protective rim 206 of the canister 200.

In some embodiments, in order to engage the hook portion 102A of the housing 102 with the canister 200, the housing 102 may be repositioned relative to the motor 104, for example, by sliding the housing 102 relative to the motor 104. This is further explained in detail, in conjunction with FIG. 8.

Referring now to FIG. 8, a process 500 of engaging the hook portion 102A of the housing 102 with the canister 200 is illustrated, in accordance with an embodiment of the present disclosure. At step 502, the air sampling actuator 100 is in its first configuration. In this configuration, the housing 102 may be positioned vertically upwards relative to the motor 104. As such, the housing 102 may be positioned vertically upwards relative to the protective rim 206 of the canister 200, and therefore, unengaged with the protective rim 206. One or more securing fasteners 110 may be loosely engaged with the motor 104 through the one or more slots 102C of the housing 102.

In order to engage the hook portion 102A with the protective rim 206 of the canister 200, the housing 102 may have to be moved vertically downwards relative to the motor 104 by sliding the housing 102, so as to reposition the housing 102 relative to the motor 104, to thereby engage the hook portion 102A with the protective rim 206.

Therefore, at step 504, the housing 102 is repositioned relative to the motor 104, upon sliding the housing 102 vertically downwards relative to the motor 104. As a result, the hook portion 102A is engaged with the protective rim 206. Once the hook portion 102A is engaged with the protective rim 206, the one or more securing fasteners 110 may be later tightened to fix the position of the housing 102 with the motor 104 (at step 410).

With reference again to FIG. 7, in some embodiments, at step 408, the housing 102 may be locked with the canister 200, by using one or more locking fasteners through one or more locking holes 102B on the hook portion 102A of the housing 102. For example, the one or more locking fasteners may include bolts, or nut-bolt assembles, or screws, etc.

In some embodiments, at step 410, the housing 102 may be fastened with the motor 104 using the one or more securing fasteners 110 via the one or more slots 102C of the housing 102, to secure the housing 102 with the canister 200. As already explained in conjunction with FIG. 8, once the hook portion 102A is engaged with the protective rim 206, the one or more securing fasteners 110 may be tightened to fix the position of the housing 102 with the motor 104.

At step 412, the motor 104 may be triggered to generate a first mechanical action, upon transmitting a first control signal to the motor 104, to perform sampling of air by the air sampling actuator 100.

By way of an example, the first mechanical action may be an action of rotation. This first mechanical action may be transferred to the valve-controlling knob 202 to reconfigure the valve-controlling knob 202 between the closed and the open position. Further, the first mechanical action generated by the motor 104 may be transferred to the valve-controlling knob 202 through the adaptor 106. For example, the first mechanical action generated by the motor 104 may be to cause the adaptor 106 to rotate in clockwise or anticlockwise direction, and further rotate the valve-controlling knob 202 of the canister 200 in the rotate in clockwise or anticlockwise direction. The action of rotation may be for a predetermined time and a predetermined extent. In other words, the action of rotation is to cause the rotation of the valve-controlling knob 202 to configure the valve-controlling knob 202 in the open position for a predetermined time and a predetermined extent, before reconfiguring the valve-controlling knob 202 back in the closed position. As such, the action of rotation is to cause the valve 204 to open for a predetermined time and a predetermined extent, before closing back the valve 204, to suck a required amount of atmospheric air in the canister 200, during that predetermined time.

As such, the valve 204 may be biased in the closed position, e.g., by a spring. The action of rotation may rotate the valve 204 (to cause the valve 204 to open) for a predetermined time, before stopping the action of rotation. Once the action of rotation is stopped, the valve 204 may fall back into the closed position by the action of the spring. Therefore, in such embodiments, the first mechanical action may be only to cause and hold the rotation of the valve 204 for a predetermined time.

As it will be understood, the action of rotation is to obtain a sample of the required amount of atmospheric air inside the canister 200. The required amount of air can be obtained by controlling the duration of time for which the valve is opened and the extent to which the valve 204 is opened. In some embodiments, the extent to which the valve 204 can be opened may be fixed. Therefore, in such embodiments, the action of rotation is to cause the valve 204 to open only for a predetermined time, before closing back the valve 204, to suck a required amount of atmospheric air in the canister 200.

Alternately, first mechanical action may be an action of rotation in a first direction to start sampling of air by the air sampling actuator 100. Therefore, the first mechanical action generated by the motor 104 may cause the adaptor 106 to rotate in one of a clockwise or anticlockwise direction, and further rotate the valve-controlling knob 202 of the canister 200 in clockwise or anticlockwise direction. For example, once the action of rotation through the first mechanical action is performed, the valve-controlling knob 202 is rotated in the first direction, to open the valve 204. In order to close the valve 204, an action of rotation in a second direction (i.e., opposite direction) is required.

To this end, additionally, the motor 104 may be triggered to generate a second mechanical action, upon transmitting a second control signal to the motor. The second control action may be directed at stopping sampling of air by the air sampling actuator 100. The second mechanical action may be an action of rotation in the second direction (opposite to the action of rotation in the first direction). This action of rotation in the second direction may rotate the adaptor 106, and therefore the valve-controlling knob 202 of the canister 200 in opposite direction, to thereby close the valve 204.

The above disclosure describes an air and fluid sampling valve actuator device deployable on an air/fluid collection reservoir (e.g., a canister) for collecting a sample of air from the atmosphere. The air sampling actuator provides for a modular assembly with the canister, and is therefore, adaptable with a variety of pre-existing canisters with pre-existing flow valves. Further, the air sampling actuator can be fitted (retro-fitted) to any pre-existing canister without requiring substantial modifications in the pre-existing canisters. Electrical interface allows integration into a variety of platforms. Furthermore, the air sampling actuator is able to collect a sample air in an automated manner with minimum human intervention, based on set parameters, user-input, and sensor input. The air sampling actuator can be triggered remotely or automatically using sensor control. By employing automated techniques, errors of incorrect amount of air samples are also minimized. Further, by providing a motor with feedback control, variable collection opening area (of the flow valve) and accurate closing of the valve is ensured. Moreover, by providing for physical actuation of the valve, the air sampling actuator ensures that there is no unintended loss of vacuum inside the canister over time. Inclement weather has minimum affect due to the mechanical process of the device.

It is intended that the disclosure and examples be considered as exemplary only, with a true scope and spirit of disclosed embodiments being indicated by the following claims.

What is claimed is:

1. An air sampling actuator deployable on a canister, the air sampling actuator comprising:
    a housing configured to mount on the canister;
    a motor configured to be accommodated in the housing, wherein the motor is powered by an electrical supply, wherein the motor is configured to generate a mechanical action, in response to a control signal received by the motor; and
    an adaptor coupled to the motor comprising:
        an output axis about which the mechanical action rotates;
        a cup-shaped feature comprising:
            a web having a substantially flat and a substantially circular shape; and
            a flange built along a periphery of the web and extending out from the web, the flange comprising an inner surface and an anchor hole;
    wherein the inner surface of the flange is configured to engage with an outer surface of a valve-controlling knob of the canister, the valve-controlling knob defining a knob axis about which the valve-controlling knob rotates;
    wherein the anchor hole allows the adaptor to be locked with the valve-controlling knob of the canister, using an anchoring fastener;
    wherein in a first configuration of the air sampling actuator:
        the adaptor is uncoupled from the valve-controlling knob of the canister and the canister is under vacuum; and
    wherein in a second configuration of the air sampling actuator:
        the adaptor is coupled with the valve-controlling knob of the canister, to transfer the mechanical action generated by the motor to the valve-controlling knob of the canister with the knob axis and the output axis coaxial, to reconfigure the valve-controlling knob of the canister and, consequentially, to release the vacuum inside the canister to allow intake of atmospheric air inside the canister for sampling.

2. The air sampling actuator of claim 1, wherein the motor is configured as a servo motor.

3. The air sampling actuator of claim 1,
    wherein the mechanical action comprises:
        an action of rotation or an action of linear displacement is for at least one of a predetermined time or a predetermined extent.

4. The air sampling actuator of claim 3, wherein reconfiguring the valve-controlling knob of the canister comprises rotary displacement or linear displacement of the valve-controlling knob for the predetermined time or the predetermined extent corresponding to the action of rotation.

5. The air sampling actuator of claim 1,
    wherein the inner surface of the flange comprises:
        one or more detents configured to engage with the outer surface of the valve-controlling knob of the canister.

6. The air sampling actuator of claim 1 further comprising:
    a hook portion defined on the housing;
    wherein the hook portion is configured to unengage with the canister in the first configuration and to engage with the canister in the second configuration.

7. The air sampling actuator of claim 6, wherein the hook portion comprises:
    one or more locking holes to allow the housing to be locked with the canister using one or more locking fasteners.

8. The air sampling actuator of claim 1,
    wherein the housing comprises:
        one or more slots, each of the one or more slots configured to receive a securing fastener to fasten the housing with the motor, to secure the housing with the canister; and
    wherein the housing is configured to slide relative to the motor via the one or more slots.

9. The air sampling actuator of claim 1,
    wherein the canister comprises a valve configured to maintain or release the vacuum inside the canister; and
    wherein the valve is operated by the valve-controlling knob.

10. A method of sampling air by an air sampling actuator, the method comprising:
    coaxially aligning and interfacing an adaptor of the air sampling actuator with a valve-controlling knob of a canister;
    wherein the canister in under vacuum;
    wherein the adaptor is a cup-shaped comprising:
        a web having a substantially flat and a substantially circular shape; and
        a flange built along a periphery of the web and extending out from the web, wherein the flange comprises an inner surface that is configured to engage with an outer surface of the valve-controlling knob of the canister, and wherein the flange further comprises an anchor hole that allows the adaptor to be locked with the valve-controlling knob of the canister, using an anchoring fastener;
    wherein the adaptor is coupled to a motor,
    wherein the motor is configured to be accommodated in a housing of the air sampling actuator,
    wherein the motor is powered by an electrical supply, and wherein the motor is configured to generate one or more mechanical actions, in response to a control signal received by the motor;

upon interfacing the adaptor with the valve-controlling knob of the canister, engaging the housing with the canister; and triggering the motor to generate a first mechanical action, by transmitting a first control signal to the motor, to start sampling of air by the air sampling actuator by releasing the vacuum inside the canister to allow intake of atmospheric air inside the canister for sampling.

11. The method of claim 10 and further comprising:
triggering the motor to generate a second mechanical action, upon transmitting a second control signal to the motor, to stop sampling of air by the air sampling actuator.

12. The method of claim 11,
wherein the first mechanical action comprises:
an action of rotation or an action of linear displacement in a first direction of a predetermined extent or for a predetermined time;
wherein the second mechanical action comprises:
an action of rotation or an action of linear displacement in a second direction of the predetermined extent or for a predetermined time; and
wherein the motor is configured as a servo motor.

13. The method of claim 10, wherein engaging the housing with the canister comprises:
sliding the housing relative to the motor, to cause a hook portion defined on the housing to engage with the canister;
locking the housing with the canister, by using one or more locking fasteners through one or more locking holes on the hook portion defined on the housing; and
fastening the housing with the motor using one or more securing fasteners via one or more slots of the housing, to secure the housing with the canister, wherein each of the one or more slots is configured to receive a securing fastener.

14. The air sampling actuator of claim 1, wherein the motor comprises a feedback control to allow the motor to perform controlled opening and controlled closing position of the valve-controlling knob, and wherein the feedback control comprises an optical encoder that provides closed-loop feedback to the motor.

15. The method of claim 11, wherein the motor comprises a feedback control to allow the motor to perform the first mechanical action or the second mechanical action in a controlled manner, and wherein the feedback control comprises an optical encoder that provides closed-loop feedback to the motor.

* * * * *